Patented Dec. 13, 1949

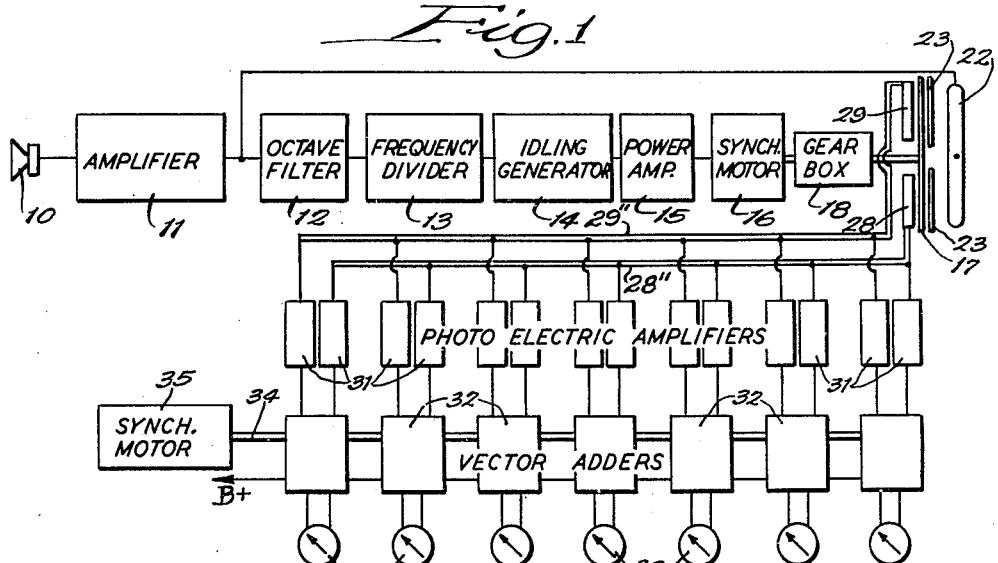
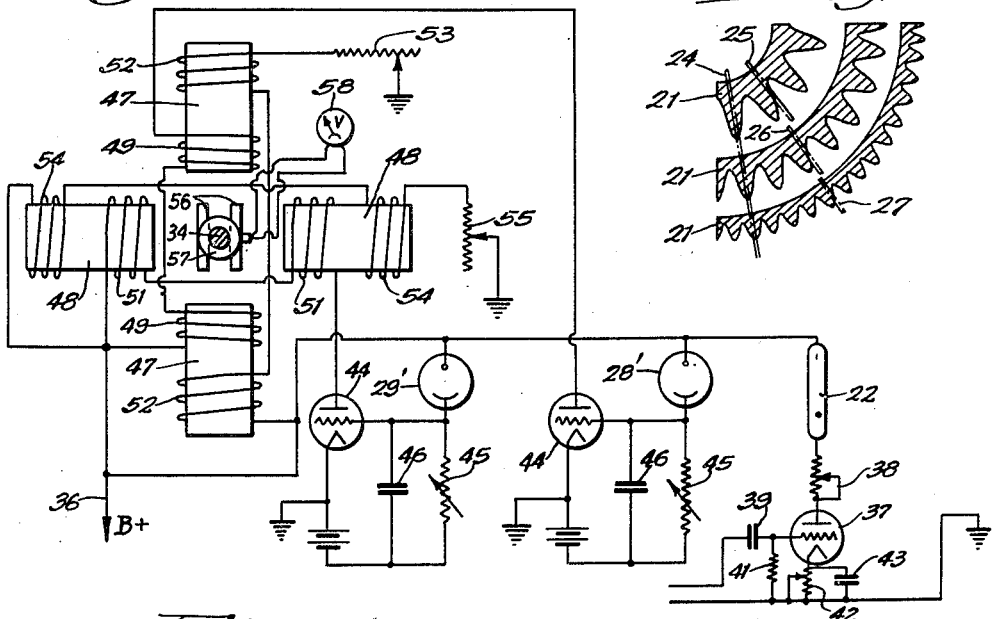
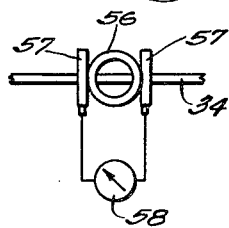

2,491,190

UNITED STATES PATENT OFFICE 2,491,190

APPARATUS FOR ANALYZING WAVES

Thomas H. Long, Elkhart, Ind., assignor to C. G. Conn, Ltd., Elkhart, Ind., a corporation of Indiana Application June 30, 1945, Serial No. 602,612

12 Claims. (Cl. 175—183)

1

This invention relates to apparatus for analyzing waves and more particularly to apparatus for measuring the relative values of harmonics or other components making up a complex wave.

One of the objects of the invention is to provide apparatus for analyzing waves in which a pair of D. C. voltages proportional in amplitude to the wave or the harmonic or components thereof to be measured at different phase positions are added vectorially to give an indication which is independent of phase.

Another object is to provide apparatus for analyzing waves in which a pair of D. C. voltages are added vectorially directly by a simple, inexpensive mechanism to give an instantaneous indication.

Still another object is to provide apparatus by which the relative values of a plurality of harmonics or other components of a complex wave can be simultaneously indicated independent of phase.

A further object is to provide apparatus in which voltages are generated by photoelectric cells from a moving pattern illuminated by a source controlled by the wave to be analyzed and are added vectorially to give an indication which is independent of the phase relationship between the light source and the pattern.

A still further object is to provide apparatus in which voltages are added magnetically by coils lying at an angle equal to the phase angle between the voltages to produce a vector sum.

The above and other objects and advantages of the invention will be more readily apparent from the following description when read in connection with the accompanying drawing, in which—

Figure 1 is a block diagram of one form of apparatus embodying the invention;

Figure 2 is a partial elevation of the pattern disc;

Figure 3 is a circuit diagram of a part of the apparatus; and

Figure 4 is a partial elevation of one of the vector adders.

In the block diagram of Figure 1 a wave to be analyzed such, for example, as a sound wave or a musical tone is picked up by a microphone 10 and is fed to an amplifier 11 where it is amplified without substantial wave form distortion. The amplifier is connected through an octave filter 12, a frequency divider 13, an idling generator 14, and a power amplifier 15 to a synchronous motor 16 to operate the motor at a speed proportional to the fundamental frequency of

2 the wave to be analyzed. The motor drives a pattern disc 17 through a gear box 18.

The octave filter preferably includes a plurality of low pass filter circuits which may be selectively employed to supply to the frequency divider the fundamental frequency of the wave to be analyzed while excluding higher components.

The octave filter may conveniently be adjusted in octave steps, such as 50, 100, 200, 400, etc., cycles per second and the frequency divider may be adjustable to divide the frequency supplied to it by 1, 2, 4, 8, etc. The idling generator 14 is a low frequency oscillator which is employed to supply a minimum frequency current to the motor so that it will run at a minimum speed when no signal is supplied and so that the motor can come up to synchronous signal speed more rapidly. The gear box is preferably adjustable to supply various gear ratios between the motor and the pattern disc.

Assuming a fundamental frequency of 50 C. P. S. or less, the octave filter will be adjusted to pass frequencies below 50 C. P. S. and the frequency divider will be connected to divide by one. Under these conditions, the motor will be supplied current of 50 C. P. S. or less corresponding to the fundamental wave frequency and will operate at a proportional synchronous speed. For example, with a four pole synchronous motor, 50 cycles will drive it at 1500 R. P. M., and the gear box may be so adjusted that the disc will be driven at 187.5 R. P. M. which is the disc speed required to generate 50 C. P. S. and appropriate multiples thereof when patterns are employed having 16, 32, 48, etc., cycles per pattern ring. When a wave is to be analyzed whose fundamental frequency is, for example, 100 C. P. S., the octave filter will be set to pass anything up to 100 cycles and the frequency divider will be set to divide by two. The motor will, therefore, be driven at the same speed but the gear box is preferably so adjusted that it will drive the disc at 375 R. P. M. This construction is preferably employed to eliminate excessive motor speeds at higher wave frequencies.

The pattern disc 17, as best seen in Figure 2, carries a plurality of patterns corresponding in number to the number of partials or components to be indicated. As shown, the patterns are in the form of rings 21 which vary sinusoidally in width and which are formed with different numbers of sinusoidal changes in different rings. Preferably the inner ring may contain, for example, sixteen complete cycles, the next outer ring 32 complete cycles, the next outer ring 48 complete cycles, etc., corresponding to the variations between the fundamental frequency and the several harmonic frequencies making up the complex wave. The pattern may be arranged either to transmit light through it or to reflect light but in the forms shown, the discs are preferably made transparent or translucent and the pattern rings are made opaque.

The pattern disc is adapted to be illuminated by a light source, shown as a gaseous discharge tube 22, connected to the output of the amplifier 11 so that its intensity will vary with the instantaneous amplitude of the wave to be analyzed. Since light values canont be negative, the tube is biased in any desired manner by a biasing current greater than the maximum negative current supplied from the amplifier so that it will never be completely extinguished. The tube illuminates the pattern disc 17 through a masking plate 23 formed as best seen in Figure 2 with relatively narrow radial slots. One of the slots, as indicated at 24, may extend continuously across the several pattern rings which are so arranged that when the slot intersects the maximum width of the inner ring, it will at the same time intersect a maximum width position on each of the other rings. A series of slots 25, 26 and 27 are formed in the masking plate opposite the pattern rings respectively and so spaced from the slot 24 as to lie opposite a portion of the pattern ring in question displaced 90° in phase from the slot 24.

Light from the source 22 passing through the slots in the masking plate and through the pattern disc is picked up by two series of photoelectric cells 28 and 29. Each of the series of photoelectric cells includes a separate cell for each of the pattern rings and the several cells are aligned with the slots in the masking plate to be illuminated by the light passing therethrough. Since the slots are displaced 90° in phase relative to the pattern, the pair of photocells corresponding to each of the pattern rings will generate voltages proportional to the maximum light intensity variation times a function of the phase angle between the pattern and the light.

It will be apparent that each of the photocells will receive a varying illumination depending upon the complex shape of the wave to be analyzed and the varying light transmission coefficient of the pattern. Frequencies in the wave differing from the frequency of the pattern changes will produce alternating voltages having an average value of zero. These voltages may be filtered out by filter networks or by the inertia of the system and may be disregarded. Frequencies in the wave which are the same as the frequency of the pattern will produce a steady voltage in the photocell proportional to the light intensity variation, the pattern transmission coefficient, and the cosine of the phase angle between the wave frequency and the pattern. In effect, therefore, the photocells produce D. C. voltages proportional to the amplitudes of the wave components at 90° phase displaced positions.

In order to combine the voltages vectorially, each of the photocells in the sets 28 and 29 is connected individually to an amplifier 31. The amplifiers, as shown, are arranged in pairs with one amplifier of a pair connected to one of the cells in the set 28 by a conductor extending through a conduit 28'' and the other connected to the corresponding cell in the set 29 by a conductor extending through a conduit 29''. If identical amplifiers are employed their outputs will be voltages corresponding to the amplitudes of the wave components at positions displaced from each other 90° in phase.

The outputs of the pairs of amplifiers are added vectorially by vector adders 32, there being one such vector adder for each pair of amplifiers. The vector adders add the amplified voltages vectorially and include means to compensate for the voltage produced by the bias on the light so that their outputs are proportional to the amplitude of the partial of the complex wave whose frequency corresponds to the frequency of the pattern ring corresponding to the vector adder in question. The outputs of the vector adders are individually indicated on voltmeters 33 which will simultaneously indicate the relative values of the several harmonics or components making up the wave. As shown in Figure 1, a common shaft 34 driven by a constant speed motor such as a synchronous motor 35 extends through the several vector adders and forms a common part thereof.

The circuit is partially indicated in Figure 3 which shows a portion of the circuit for controlling the light source 22, portions of the photoelectric cell circuits and the vector adder circuit. As illustrated, the light source 22 is connected to a common plus B terminal 36 which may conveniently form the B supply for the several amplifier and vector adder circuits. The lamp is supplied through an amplifier tube 37 whose plate circuit is connected to the lamp through a variable resistor 38 and which is supplied from the amplifier 11 through a condenser 39. A fixed resistor 41, an adjustable cathode resistor 42 and a condenser 43 across the cathode resistor of the tube 37 serve to bias the tube so that a constant biasing current will be supplied to the lamp. This current can be adjusted through the adjustable resistor 42 and further through the plate resistor 38 so that the lamp will have a constant average intensity when no signal is supplied through the amplifier. Individual photocells forming parts of the sets 28 and 29 are indicated at 28' and 29'. Each of these cells controls an amplifier tube 44 which may have a resistor 45 and condenser 46 in parallel in its grid circuit to form a filtering stage to filter out undesired higher frequencies from its output circuit. It will be understood that the amplifier tubes 44 diagrammatically represent any desired type of amplifiers which may be used in the amplifier stages 31. The vector adders, one of which is illustrated in Figure 3, include non-magnetic bobbins 47 and 48 each divided into two sections spaced axially at their centers to leave an open space at the intersection of their axes. The bobbins are arranged with their axes at an angle corresponding to the phase angle between the photoelectric cells and in the embodiment shown lie at 909° relative to each other.

The bobbin sections 47 carry windings 49 connected in series between the amplifier tube 44 which is controlled by the photocell 28' and the plus B supply 36. Similarly, the bobbin sections 48 carry windings 51 connected in series between the plate of the tube 44 which is controlled by the photocell 29' and the plus B supply. Thus, the windings 49 will have impressed thereon a voltage proportional to that generated by the photocell 28' while the windings 51 will have impressed thereon a voltage proportional to that generated by the photocell 29'.

In order to compensate for the fixed bias on the lamp 22, compensating windings 52 are wound on the bobbin sections 47 and are connected in series between the plus B supply and ground through a rheostat 53. Similarly, compensating windings 54 are mounted on the bobbin sections 48 and are connected in series between the plus B supply and ground through a rheostat 55. The rheostats 53 and 55 are so adjusted that a biasing current will be supplied to the windings 52 and 54 just sufficient to compensate for the D. C. component in the output of the tubes 44 produced by the bias on the light 22 and by any other D. C. biases employed in the system. Thus, the magnetic field in the space between the bobbin sections will be influenced only by the voltage which is due to the harmonic or component frequency present in the complex wave. Since the coils are arranged at the same angle as the phase angle between the photocells, the voltages will be added vectorially to produce a resultant magnetic field proportional to the vector sum of the values of the harmonic or component frequency at phase displaced positions.

In order to measure the resultant magnetic fields, the shaft 34 extends between the core sections with its axis intersecting the intersecting axes of the cores. The shaft carries on its opposite sides a pair of coils 56, a pair of coils being used for symmetry. At the opposite ends of the coils, the shaft carries slip rings 57 engaged by brushes which are connected in circuit with voltmeter 58. It is necessary that the coils 56 be rotated since for any constant signal level and tone quality being measured the magnetic field resulting from the coils 49 and 51 of the vector adder is unchanging so that movement of the coils is necessary to measure the vector sum of the magnetic fields involved. Thus the voltage induced in the coils 56 will be proportional to the resultant magnetic field and will, therefore, be a measure of the particular partial or component of the complex wave which corresponds in frequency to the cyclic changes of the particular pattern ring which influences the cells 28' and 29'. This voltage indicated on the voltmeter 58 gives a direct and instantaneous indication of the value of such component.

In using the apparatus of the invention, a wave to be analyzed, such as a musical note, may be picked up by the microphone 10 to drive the pattern disc 17 at a speed proportional to its fundamental frequency and at the same time to control flashing of the light 22.

Through the photoelectric system, this wave will generate a plurality of pairs of voltages corresponding to the several component frequencies making up the complex wave. These pairs of voltages are separately added vectorially to give instantaneous indications of the relative amplitudes of the component frequencies so that the apparatus will simultaneously indicate to an operator the several harmonic frequencies present in a complex wave and their relative values. It will be understood that any number of rings, photocells and vector adders could be employed to correspond to the number of harmonic or component frequencies to be determined.

While one embodiment of the invention has been shown and described in detail herein, it will be understood that this is illustrative only and is not intended as a definition of the scope of the invention, reference being had to the appended claims for this purpose.

What is claimed is:

1. Apparatus for analyzing waves comprising means for producing from a wave to be analyzed a pair of voltages proportional in amplitude to the wave at phase displaced positions, a pair of coils lying at an angle to each other corresponding to the phase angle between said positions, means connecting the coils respectively to the voltage producing means, and means to measure the resultant magnetic field produced by the coils.

2. Apparatus for analyzing waves comprising means for producing from a wave to be analyzed a pair of voltages proportional in amplitude to the wave at phase displaced positions, a pair of coils lying at an angle to each other corresponding to the phase angle between said positions, means connecting the coils respectively to the voltage producing means, a coil rotatable in the magnetic field produced by said pair of coils, and means to measure the voltage induced in the last named coil.

3. Apparatus for analyzing waves comprising means for producing from a wave to be analyzed a pair of voltages proportional in amplitude to the wave at phase displaced positions, a pair of bobbins arranged with their axes crossing at an angle corresponding to the phase angle between said positions, each of the bobbins extending on both sides of their crossing point, a pair of coils on each bobbin lying respectively on opposite sides of the crossing point, the coils on each bobbin being connected in series to said means to receive one of said voltages, and means to measure the resultant magnetic field at the crossing point of the bobbins.

4. Apparatus for analyzing waves comprising means for producing from a wave to be analyzed a pair of voltages proportional in amplitude to the wave at phase displaced positions, a pair of bobbins arranged with their axes crossing at an angle corresponding to the phase angle between said positions, each of the bobbins extending on both sides of their crossing point, a pair of coils on each bobbin lying respectively on opposite sides of the crossing point, the coils on each bobbin being connected in series to said means to receive one of said voltages, a coil rotatable on an axis intersecting the crossing point of the bobbins, and means to measure the current induced in the last named coil.

5. Apparatus for analyzing waves comprising a movable member having a sinusoidally varying pattern thereon, means to drive the pattern at a speed proportional to the frequency of a wave to be analyzed, a light source to illuminate the pattern, means responsive to the wave to control the light source so that it will have an instantaneous intensity proportional to the instantaneous amplitude of the wave, a pair of photoelectric devices adjacent the pattern phase displaced relative to the pattern to generate voltages proportional to the product of the light intensity and the pattern transmission coefficient and a function of the phase angle between the wave and the pattern, a pair of coils with their axes at an angle corresponding to the phase angle between the photoelectric devices connected respectively to the photoelectric devices, and means to measure the resultant magnetic field from the coils.

6. Apparatus for analyzing waves comprising a movable member having a sinusoidally varying pattern thereon, means to drive the pattern at a speed proportional to the frequency of a wave to be analyzed, a light source to illuminate the pattern, means responsive to the wave to control the light source so that its intensity variation will be proportional to the amplitude variation of the wave, a pair of photoelectric devices adjacent the pattern phase displaced relative to the pattern to generate voltages proportional to the product of the light intensity and the pattern transmission coefficient and a function of the phase angle between the wave and pattern, a pair of coils with their axes at an angle correseponding to the phase angle between the photoelectric devices connected respectively to the photoelctric devices, a third coil rotatable in the magnetic field produced by the pair of coils, and means to measure the voltage induced in the third coil.

7. Apparatus for analyzing waves comprising a movable pattern member having a sinusoidally varying pattern thereon, means to drive the pattern member at a speed proportional to the frequency of a wave to be measured, a light source to illuminate the pattern member, means responsive to the wave to control the light source so that it will have an intensity equal to the instantaneous value of the wave plus a constant, a pair of photoelectric devices adjacent the pattern phase displaced relative to the pattern to generate voltages proportional to the product of the light intensity and the pattern transmission coefficient and a function of the phase angle between the wave and the pattern, a pair of coils with their axes at an angle corresponding to the phase angle between the photoelectric devices connected respectively to the photoelectric devices to be responsive to the voltages, biasing windings associated with the coils respectively, means to supply biasing current to the windings proportional to said constant whereby the resultant magnetic field adjacent the coils and windings will be responsive only to the voltage component of the wave to be analyzed having a frequency the same as the pattern frequency, and means to measure said resultant magnetic field.

8. Apparatus for analyzing waves comprising a movable pattern member having a sinusoidally varying pattern thereon, means to drive the pattern member at a speed proportional to the frequency of a wave to be measured, a light source to illuminate the pattern member, means responsive to the wave to control the light source so that it will have an intensity equal to the instantaneous value of the wave plus a constant, a pair of photoelectric devices adjacent the pattern phase displaced relative to the pattern to generate voltages proportional to the product of the light intensity and the pattern transmission coefficient and a function of the phase angle between the wave and pattern, a pair of coils with their axes at an angle corresponding to the phase angle between the photoelectric devices connected respectively to the photoelectric devices to be responsive to the voltages, biasing windings associated with the coils respectively, means to supply biasing current to the windings proportional to said constant whereby the resultant magnetic field adjacent the coils and windings will be responsive only to the voltage on the coils, a coil rotatable in the resultant field, and means to measure the voltage induced in the coil.

9. Apparatus for analyzing waves comprising a movable pattern member a plurality of sinusoidally varying patterns on the member of different numbers of cycles, means for driving the pattern member at a speed proportional to the fundamental frequency of a wave to be measured, a light source to illuminate the pattern member, means responsive to the wave to control the light source so that it will have an instantaneous intensity proportional to the instantaneous amplitude of the wave, a pair of photoelectric devices adjacent each of the patterns phase displaced relative to the pattern to generate voltages proportional to the product of the light intensity and the pattern transmission coefficient and a function of the phase angle between the wave and the pattern, a pair of coils connected individually to each pair of photoelectric devices, the coils of each pair being at an angle to each other corresponding to the phase angle between the photoelectric devices, and means to measure the resultant magnetic field of each pair of coils.

10. Apparatus for analyzing waves comprising a movable pattern member, a plurality of sinusoidally varying patterns on the member of different numbers of cycles, means for driving the pattern member at a speed proportional to the fundamental frequency of a wave to be measured, a light source to illuminate the pattern member, means responsive to the wave to control the light source so that it will have an instantaneous intensity proportional to the instantaneous amplitude of the wave, a pair of photoelectric devices adjacent each of the patterns phase displaced relative to the pattern to generate voltages proportional to the product of the light intensity and the pattern transmission coefficient and a function of the phase angle between the photoelectric devices, a pair of coils connected individually to each pair of photoelectric devices, the coils of each pair being at an angle to each other corresponding to the phase angle between the photoelectric devices, a rotatable shaft extending substantially at a right angle to the pairs of coils, coils on the shaft respectively rotatable in the fields of the pairs of coils, and means individually to measure the voltages induced in the last named coils.

11. Apparatus for analyzing waves comprising means for producing from a wave to be analyzed a voltage proportional to the amplitude of the wave at one phase position, means for producing from the wave a second voltage proportional to the amplitude of the wave at a second phase position displaced from said one phase position, means to add the voltages vectorially, and means for measuring the vector sum of the voltages.

12. Apparatus for analyzing waves comprising a movable member having a sinusoidally varying pattern thereon, means to drive the pattern at a speed proportional to the frequency of a wave to be analyzed, a light source to illuminate the pattern, means responsive to the wave to control the intensity of the light source, a pair of pickup devices responsive to the intensity of illumination of the pattern at phase displaced positions to generate voltages, means to add the voltages vectorially, and means to indicate the vector sum of the voltages.

THOMAS H. LONG.

REFERENCES CITED

The following references are of record in the file of this patent:

UNITED STATES PATENTS

| Number | Name | Date |
| --- | --- | --- |
| 2,241,371 | Huxford | May 6, 1941 |
| 2,424,131 | Warnick | July 15, 1947 |

OTHER REFERENCES

Electronic Engineering, November 1943, pages 236–239.